INVENTOR:
CASIMIR W. KRYSTYNIAK,

HIS ATTORNEY

United States Patent Office 3,645,894
Patented Feb. 29, 1972

3,645,894
FREE-FLOWING PLASMA SPRAY POWDER
Casimir W. Krystyniak, Schenectady, N.Y., assignor to General Electric Company
Original application Dec. 1, 1965, Ser. No. 510,931, now Patent No. 3,429,962, dated Feb. 25, 1969. Divided and this application Aug. 16, 1968, Ser. No. 753,211
Int. Cl. B05b 7/20; C04b 35/48
U.S. Cl. 252—1
3 Claims

ABSTRACT OF THE DISCLOSURE

The preparation of metallic oxide layers and bodies consisting thereof by the plasma spray deposition of substantially spherically-shaped agglomerate particles of metal oxides, the particles being substantially uniform in composition and having as at least one of the metal oxides an oxide of a refractory metal, is described. Specific examples include a free-flowing powder of such spherical particles containing in physical combination (a) a first metal oxide selected from the group consisting of unstabilized zirconia and undoped thoria and (b) a second metal oxide selected from the group consisting of CaO, a mixture of rare earth oxides, $Y_2O_3$ and $Yb_2O_3$ and describe the deposition of such a powder by plasma arc spraying. As the result of this method of deposition the unstabilized $ZrO_2$ becomes stabilized or the undoped $ThO_2$ becomes doped.

---

This application is a division of application Ser. No. 510,931, filed Dec. 1, 1965 (now U.S. Patent No. 3,429,962), which relates to methods of forming metallic oxide articles, and more particularly to methods of plasma-arc spray forming of metallic oxide articles.

A metallic oxide article, which is composed of two or more component metallic oxides, requires a uniform composition in which there is an intimate mixture of the component oxides. When conventional powder techniques are used to prepare such an article from a mixture of several component metallic oxides, uniformity is difficult to attain, because of segregation of the component metallic oxides of the metallic oxide powder occurring (a) subsequent to preparation, (b) after mixing or blending, (c) during the slurry preparation and/or (d) after application of the slurry.

When plasma-arc spray techniques are used to prepare a coating or article from a plurality of components fed into the arc, non-uniformity may result from the presence of plate-like or needle-like particles in the blended powder feed, which restrict the free-flowing characteristics thereof and from segregation of the blended powder into component oxides after preparation thereof.

It is desirable for the metallic oxide article to have a specific, uniform composition. It is further desirable to have the particles intimately mixed when fused after subjecting the particles to a flame. My present invention is directed to improved particle shape and composition for plasma spray powder particles for the production of a metallic oxide article which has a uniform composition and an intimate mixture of the powder particles. This free-flowing powder composed of spherical aggregate particles is particularly suitable for the preparation of metallic oxide components for high temperature fuel cells.

In carrying out my invention spherical agglomerate particles consisting of a first metallic oxide powder characterized by oxygen-ion conductivity upon stabilization, and a second stabilizing (or doping) metallic oxide powder are prepared. During plasma arc spraying the first metal oxide becomes stabilized (or doped) by the second metal oxide.

Various other objects, features and advantages of the invention will be better understood from the following description taken in connection with the accompanied drawing in which.

Figure 1:
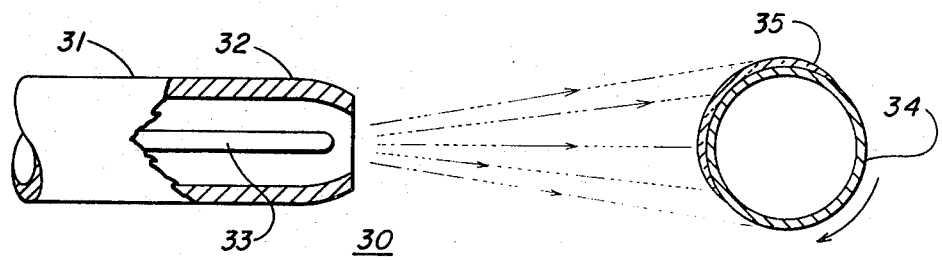
FIG. 1 is a schematic view of apparatus for employing the free-flowing powder of this invention.

In FIG. 1 of the drawing there is shown schematically apparatus 30 for employing the free-flowing powder of my invention. Apparatus 30 comprises a plasma arc spray gun 31, the nozzle portion 32 of which is shown. An electrode 33 is positioned within nozzle portion 32. Gun 31 has the outlet end of its nozzle portion 32 spaced from and directed toward a rotatable mandrel 34, for example of copper or aluminum. A partially formed metallic oxide article 35 is shown on the outer surface of mandrel 34 which is rotatable by any suitable equipment (not shown).

Figure 2:
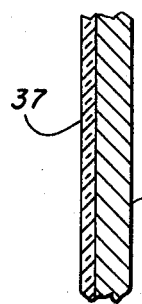
FIG. 2 is a sectional view of a portion of a modified mandrel with a metallic oxide article formed thereon by plasma arc spraying using the free-flowing spherical aggregate particles of this invention.

In FIG. 2 of the drawing there is shown a portion of a modified mandrel 36 with the metallic oxide article 37 formed thereon. If modified mandrel 36 of FIG. 2 is employed, it is substituted for mandrel 34 in FIG. 1. Mandrel 36 in FIG. 2 of the drawing is stationary and would be spaced from nozzle portion 32 of gun 31 in FIG. 1. The improved powder of this invention may be employed with various modifications of the plasma arc spray apparatus described above for the preparation of such metallic oxide articles.

I found that a very satisfactory metallic oxide article with a uniform composition and particles intimately mixed when fused is formed using plasma spray powder composed of spherical aggregate particles according to this invention, each particle consisting of a first metallic oxide characterized by oxygen-ion conductivity upon stabilization and a stabilizing second metallic oxide, plasma arc spraying these two-component spherical particles onto a mandrel, and removing the mandrel. A suitable method of removing the mandrel is to etch away the mandrel material by means of a chemical etching solution such as a 30–50 percent concentration of nitric acid for copper, and hydrochloric acid for aluminum.

Another suitable metallic oxide article is formed in accordance with my invention in which there are provided three-component spherical agglomerate metallic oxide particles containing in addition to the metal oxides recited above, a third metallic oxide selected from the group consisting of iron oxide, cobalt oxide, nickel oxide, titanium oxide, zinc oxide, titanium oxide-iron oxide, zinc oxide-iron oxide, zinc oxide-lead oxide, and 2 weight percent to 40 weight percent of uranium dioxide. Another suitable metallic oxide article is formed employing, four-component spherical agglomerate metallic oxide particles, the two metallic oxides initially recited, from 2 weight percent to 40 weight percent of uranium dioxide as the third metallic oxide and a fourth metallic oxide selected from the group consisting of iron oxide, cobalt oxide, nickel oxide, titanium oxide, zinc oxide titanium oxide-iron oxide, zinc oxide-iron oxide, and zinc oxide-lead oxide.

I found further that a very satisfactory metallic oxide composite article is formed by providing a first powder of metallic oxide spherical agglomerate particles consisting of a metallic oxide characterized by oxygen ion conductivity, when stabilized by a stabilizing metallic oxide, which is also provided in the spherical agglomerate particles of the first powder, and a second powder of spherical agglomerate particles composed of a metal oxide selected from a group consisting of iron oxide, cobalt oxide, nickel oxide, titanium oxide, zinc oxide, titanium oxide-iron oxide, zinc oxide-iron oxide, zinc oxide-lead oxide, 2 weight percent to 40 weight percent of uranium dioxide, 2 weight percent to 40 weight percent of the uranium dioxide and iron oxide, 2 weight percent to 40 weight percent of uranium dioxide and cobalt oxide, 2 weight percent to 40 weight percent of uranium dioxide and nickel oxide, 2 weight percent to 40 weight percent uranium dioxide and titanium oxide, 2 weight percent to 40 weight percent of uranium dioxide and zinc oxide, 2 weight percent to 40 weight percent uranium dioxide-titanium oxide-iron oxide, 2 weight percent to 40 weight percent of uranium dioxide-zinc oxide-iron oxide, and 2 weight percent to 40 weight percent uranium dioxide-zinc oxide-lead oxide, plasma arc spraying separately the particles of each of the first and second metallic oxide powders onto a removable mandrel, and removing the mandrel thereby forming the composite article.

In the formation of the above metallic oxide article, my method includes spraying either the first or the second metallic oxide powder onto the removable mandrel and then spraying the other powder on the surface of the first metallic oxide powder to form a composite article. Another very suitable metallic oxide composite article is formed in accordance with my above method which includes spraying the second metallic oxide powder onto the mandrel first, spraying the first metallic oxide powder onto the surface of the second metallic oxide powder, and then spraying the second metallic oxide powder onto the surface of the first metallic oxide powder thereby forming a composite article.

The principal metallic oxides which are characterized by oxygen ion conductivity upon stabilization are zirconia and thoria. Each of these metallic oxides serves as an oxygen-ion transport medium by virtue of the anion vacancies generated in the metallic oxide structure upon cathodic substitution of metal from the stabilizing metal oxide for metal from the initial metallic oxide. Upon stabilization the metallic oxide is resistant to large volume changes upon thermal cycling and hence is mechanically stable. The stabilized metallic oxide becomes a low-resistance ionic conductor.

The stabilizing metallic oxide provided comprises at least one and may consist of a combination of several specific oxides, such as calcium oxide, yttrium oxide, and ytterbium oxide or a mixture of rare earth oxides. For example, a suitable metallic oxide material comprises zirconia which is stabilized with 15 molecular percent calcium oxide. Other compositions of stabilized zirconia are shown for example in "Oxide Ceramics" by Ryshkewitch, Academic Press, 1960, particularly on pages 354, 364, and 376 thereof. When thoraia, a metallic oxide characterized by oxygen-ion conductivity upon stabilization is stabilized by the addition of one or more of the above stabilizing metallic oxides, the stabilized thoria is referred to as doped thoria rather than stabilized thoria. For example, a suitable doped thoria consists of thoria which is doped with the addition of 4 molecular percent calcium oxide.

When the above metallic oxide powders are combined in the form of spherical agglomerate particles of the component metallic oxides, such powders exhibit superior properties of uniform composition and of free-flowing characteristics. These powders of spherical agglomerate particles provide a material which is more effectively plasma arc sprayed to provide a metallic oxide article of uniform composition.

The above metallic oxide powders with spherical agglomerate particles are prepared as described and claimed in my application Ser. No. 510,886, filed Dec. 1, 1965, now issued as U.S. Pat. No. 3,373,119. Such metallic oxide powders consisting of particles in the form of spherical agglomerates are prepared by providing the component metallic oxide powders, blending these component metallic oxide powders, preparing a slurry of the blended oxide powders, spray drying the slurry thereby producing a powder with spherical agglomerate particles, and collecting the spray-dried powder. This method of preparing powders produces a superior metallic oxide powder with the particles thereof in the form of spherical agglomerates of component metallic oxides having a specific uniform composition and free-flowing characteristics which prevents non-uniformity in the powder.

For example, a metallic oxide powder characterized by oxygen ion conductivity upon stabilization, such as zirconia, is blended with a stabilizing metallic oxide powder such as calcia. A slurry of these blended powders is then prepared. In the preparation of such a slurry a liquid comprising water, alcohol and inorganic binder is added to the blended oxide powders to provide the slurry. The slurry of the blended oxide powders and liquid is then spray-dried by spray-drying equipment as described further in the above-mentioned Pat. No. 3,373,119. The spray-dried powder is next collected and comprises spherical agglomerate particles of component metallic oxide powders, the spray-dried powder having a uniform composition and free-flowing characteristics. In a similar manner, other powders which are employed in my present method are prepared in accordance with the above-identified copending patent application.

In the operation of the plasma arc spray apparatus 30 shown in FIG. 1 of the drawing, plasma arc spray gun 31 employs a carrier gas such as argon which flows through nozzle portion 32 thereof and its outlet end. When gun 31 is activated, the electrical current supplied thereto strikes an arc between electrically conductive nozzle portion 32 and electrode 33. In this manner, argon gas flowing through the outlet of nozzle portion 32 is ionized to form argon ions whereby a plasma is created and directed towards mandrel 34. A metallic oxide powder comprising spherical agglomerate particles consisting of a metallic oxide characterized by exhibiting oxygen-ion conductivity when stabilized, such as zirconia, and a stabilizing metallic oxide, such as calcia, is supplied to gun 31 and flowed through its nozzle portion 32 in the argon carrier gas. Plasma formed by the ionized gas heats the spherical agglomerate particles to form a spray of molten metal oxide which is carried by the plasma and deposited upon the surface of mandrel 34.

Mandrel 34, which is constructed of a material such as a thin-walled copper tube or a thin-walled aluminum tube is rotated about its axis by any suitable type of equipment (not shown). I prefer such a mandrel tube with a thickness between $\frac{1}{16}$ inch to $\frac{1}{32}$ inch. In this manner as it is shown in FIG. 1, mandrel 34 rotates clockwise thereby providing for a uniform deposit produced by the impact of the molten metallic oxide particles upon the entire surface of the mandrel. A modified form of mandrel is shown in FIG. 2 wherein mandrel 36 is a flat plate of material such as copper or aluminum, on which is shown a deposit 37 of metallic oxides which deposit has been produced by plasma arc spraying the free-flowing powder of this invention from gun 11. When mandrel 36 is employed, this stationary mandrel replaces rotatable mandrel 33 and is positioned from the end of gun nozzle 32. Otherwise the procedure for depositing metallic oxide on its surface is the same as deposit of the metallic oxides upon the surface of the rotating mandrel 33.

Figure 3:
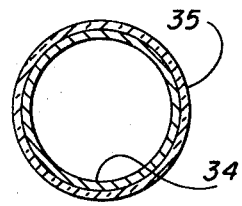
FIG. 3 is a sectional view of the mandrel shown in FIG. 1 of the drawing which mandrel has a metallic oxide article thereon by plasma arc spraying using the free-flowing spherical aggregate particles of this invention.

In FIG. 3 of the drawing there is shown mandrel 34 with a uniform coating, or deposit, 35 of metallic oxides thereon. This deposit of metallic oxides has been produced in accordance with the method disclosed in FIG. 1 of the drawing.

Figure 4:
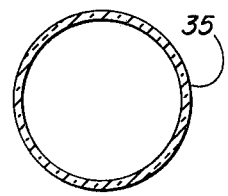
FIG. 4 is a sectional view of a metallic oxide article formed by plasma arc spraying with mandrel removed.

In FIG. 4 of the drawing there is shown a metallic oxide article 35 of uniform composition which article was deposited initially on mandrel 34, which is shown in both FIGS. 1 and 3 of the drawing. After the deposit of metallic oxides on mandrel 34 has been accomplished to the thickness by plasma-arc spraying, plasma arc spray gun 31 is turned off and the rotation of mandrel 34 is stopped. After metallic oxide composition layer 35 has cooled to room temperature, mandrel 34 with metallic oxide composition layer 35 thereon is removed from the rotating equipment for mandrel 34 and is shown in FIG. 3 of the drawing.

The metallic oxide composition layer 35 on mandrel 34 is removed from mandrel 34 by removal of mandrel 34. This removal of the mandrel 34 is accomplished, for example, by etching out mandrel 34 through the employment of a suitable chemical etching agent. For example, if a copper mandrel is employed, the mandrel is preferably dipped in a solution of 30–50 percent concentration of nitric acid whereupon the material of the mandrel is etched away. It is then desirable to dip the metallic oxide article in a rinse of ethylenediamine tetraacetic acid to remove the final traces of copper. The article is rinsed in water and allowed to dry. Such an article is shown in section in FIG. 4 of the drawing. If an aluminum mandrel is employed, the mandrel is preferably dipped in a solution of hydrochloric acid whereupon the material of the mandrel is etched away. Subsequently, the article is rinsed in water and dried.

When a metallic oxide deposit is formed by plasma-arc spraying the metallic oxide spherical particles of this invention, wherein a metallic oxide characterized by oxygen ion conductivity, when stabilized, and a stabilizing metallic oxide are agglomerated, this article is useful, for example, as a solid electrolyte for a high temperature fuel cell.

Figure 5:
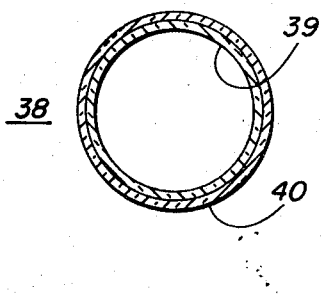
FIG. 5 is a sectional view formed of a multi-layer metallic oxide article formed by plasma arc spraying using the free-flowing powder of this invention.

In FIG. 5 of the drawing there is shown a composite metallic oxide article 38 which comprises a layer 39 of a first metallic oxide composition, and a layer 40 of a second metallic oxide composition adhering firmly to the surface of layer 39. This article is made employing the apparatus shown in FIG. 1 of the drawing.

Figure 6:
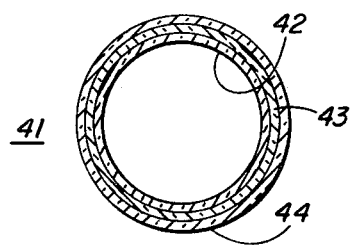
FIG. 6 is a sectional view through a second multi-layer metallic oxide article.

In FIG. 6 of the drawing there is shown a composite metallic oxide article 41 which comprises a layer 42 of a first metallic oxide composition, a layer 43 of a second metallic oxide composition adhering to the exterior surface of layer 42, and a layer 44 of a third metallic oxide composition adhering firmly to the exterior surface of layer 43. This article is made in accordance with my method employing the apparatus, which is shown in FIG. 1 of the drawing.

The methods of forming the articles which are shown in FIGS. 5 and 6 of the drawing are similar to the methods of forming the articles shown in FIG. 4 of the drawing. A first metallic oxide powder with spherical agglomerate particles, and a second metallic oxide powder with spherical agglomerate particles are provided to produce the resulting composite articles. Each of these metallic oxide powders are plasma sprayed separately, for example, using the apparatus shown in FIG. 1 of the drawing, upon a removable mandrel such as mandrel 34. In this manner, a first metallic oxide layer 39 is formed around mandrel 34, and a second metallic oxide layer 40 is formed around and adheres firmly to the exterior surface of layer 39. Subsequently the mandrel is chemically etched away as described above to provide composite metallic oxide article 38, which consists of metallic oxide portion 39 and metallic oxide portion 40.

In FIG. 6 of the drawing, composite metallic oxide article 41 comprises a first metallic oxide layer 42, a second metallic oxide layer 43 surrounding and adhering to the exterior surface of layer 42, and a third metallic oxide layer 44 surrounding and adhering firmly to layer 43. This article is formed in accordance with my method by providing a first metallic oxide powder of spherical agglomerate particles, and a second metallic oxide powder with spherical agglomerate particles of different composition therefrom. The second metallic oxide powder is plasma arc sprayed first onto a mandrel such as mandrel 34 in FIG. 1 of the drawing. The first metallic oxide powder is then plasma sprayed onto the surface of the second metallic oxide powder. The second metallic oxide powder is then sprayed onto the exposed surface of the first metallic oxide layer, after which the mandrel is removed to provide a metallic oxide composition article.

Table I sets forth the compositions of various metallic oxide powders with spherical agglomerate particles. The powders, which are employed in my method of forming a metallic oxide article, are prepared in accordance with the method disclosed in Pat. No. 3,373,119. It is desirable to heat treat powders containing yttria in a hydrogen atmosphere prior to plasma arc spraying such powders.

TABLE I

| Composition No.: | Weight percent of powder |
|---|---|
| 1 | 85.0 $ZrO_2$, 15.0 CaO. |
| 2 | 86.0 $ZrO_2$, 14.0 CaO. |
| 3 | 85.0 $ZrO_2$, 15.0 $Y_2O_3$. |
| 4 | 81.0 $ZrO_2$, 19.0 $Y_2O_3$. |
| 5 | 73.8 $ZrO_2$, 26.2 $Yb_2O_3$. |
| 6 | 96.0 $ThO_2$, 4 CaO. |
| 7 | 96.0 $ThO_2$, 4 $Y_2O_3$. |
| 8 | 83.0 $ZrO_2$, 15.0 $Y_2O_3$, 2.0 $Fe_3O_4$. |
| 9 | 81.0 $ZrO_2$, 14.5 $Y_2O_3$, 4.5 $Fe_3O_4$. |
| 10 | 76.5 $ZrO_2$, 13.5 CaO, 10.0 $Fe_3O_4$. |
| 11 | 77.5 $ZrO_2$, 12.5 $Y_2O_3$, 10.0 $Fe_3O_4$. |
| 12 | 69.0 $ZrO_2$, 11.0 $Y_2O_3$, 20 $Fe_3O_4$. |
| 13 | 69.7 $ZrO_2$, 13.6 CaO, 16.7 $Fe_3O_4$. |
| 14 | 69.7 $ZrO_2$, 13.6 CaO, 16.7 CoO. |
| 15 | 69.7 $ZrO_2$, 13.6 CaO, 16.7 ZnO. |
| 16 | 67.5 $ZrO_2$, 15.0 $Y_2O_3$, 7.5 $TiO_2$, 10.0 $Fe_3O_4$. |
| 17 | 76.0 $ZrO_2$, 10.0 $Y_2O_3$, 3.5 ZnO, 10.5 $Fe_3O_4$. |
| 18 | 83.5 $ZrO_2$, 14.5 CaO, 2.0 $UO_2$. |
| 19 | 68.0 $ZrO_2$, 12.0 $Y_2O_3$, 20.0 $UO_2$. |
| 20 | 57.5 $ZrO_2$, 14.5 $Y_2O_3$, 28.0 $UO_2$. |
| 21 | 59.5 $ZrO_2$, 10.5 CaO, 30.0 $UO_2$. |
| 22 | 51.0 $ZrO_2$, 9.0 CaO, 40.0 $UO_2$. |
| 23 | 72.25 $ZrO_2$, 12.75 CaO, 10.0 $UO_2$, 5.0 $Fe_3O_4$. |
| 24 | 63.75 $ZrO_2$, 11.25 CaO, 20.0 $UO_2$, 5.0 $F_3O_4$. |
| 25 | 63.75 $ZrO_2$, 11.25 $Y_2O_3$, 20.0 $UO_2$, 5.0 $F_3O_4$. |

Examples with a two-component oxide powder

Metallic oxide articles are formed by providing metallic oxide powders of spherical agglomerate particles from compositions numbered 1–7 in Table I. Stabilized zirconia articles are produced when the particles of any one of the metallic oxide composition numbered 1–5 is plasma arc sprayed uniformly onto a rotatable copper or aluminum tube mandrel. Similarly, doped thoria articles are produced when the particles of either of the metallic oxide powder composition numbers 6 or 7 is plasma arc sprayed uniformly onto a rotatable copper of aluminum tube mandrel. Subsequently, each mandrel is removed by dipping it in its appropriate etching solution and rinsing it as described above. This method results in the formation of metallic oxide articles in tube configurations.

Examples with three-component oxide powders

Metallic oxide articles are formed by providing metallic oxide powders of spherical agglomerate particles from the compositions numbered 8–15 and 18–22 in above Table I. Each of compositions numbered 8–15 and 18–22 are plasma-arc sprayed uniformly onto different rotatable copper and aluminum tube mandrels. Subsequently, each mandrel is removed by dipping it in its appropriate etching solution and rinsing it as described above. This method results in the formation of uniform metallic oxide articles in tube configurations.

Examples with four-component oxide powders

Metallic oxide articles are formed by providing metallic oxide powders of spherical agglomerate particles from the compositions numbered 16–17 and 23–25 in above Table I. Each of compositions numbered 16, 17 and 23–25 are plasma arc sprayed uniformly onto different rotatable copper and aluminum tube mandrels. Subsequently, each mandrel is removed by dipping it in its appropriate etching solution and rinsing it as described above. This method results in the formation of metallic oxide articles in tube configurations.

While other modifications of this invention and variations thereof which may be employed within the scope of the invention have not been described, the invention is intended to include such as may be embraced within the following claims.

What I claim as new and desire to secure by Letters Patent of the United States is:

1. A free-flowing powder comprising a plurality of discrete substantially spherical particles, each particle containing a first metal oxide selected from the group consisting of unstabilized zirconia and undoped thoria physically combined with a second metal oxide selected from the group consisting of CaO, a mixture of rare earth oxides, $Y_2O_3$, and $Yb_2O_3$.

2. A free-flowing powder comprising a plurality of discrete substantially spherical particles substantially as recited in claim 1 wherein each particle additionally contains a third different metallic oxide.

3. A free-flowing powder comprising a plurality of discrete substantially spherical particles substantially as recited in claim 2 wherein the third metal oxide component is selected from the group consisting of iron oxide, cobalt oxide, nickel oxide, titanium oxide, zinc oxide, titanium oxide-iron oxide, zinc oxide-iron oxide, zinc oxide-lead oxide and 2 weight percent to 40 weight percent of uranium dioxide.

References Cited

UNITED STATES PATENTS

| | | | |
|---|---|---|---|
| 3,301,646 | 1/1967 | Smoot | 106—57 X |
| 3,303,033 | 2/1967 | Grange | 106—57 |
| 3,404,040 | 10/1968 | Mitoff | 106—57 X |
| 3,410,728 | 11/1968 | Fullman | 106—57 X |
| 3,436,248 | 4/1969 | Dittrich | 117—105 |
| 3,436,269 | 4/1969 | Mitoff | 106—57 X |
| 3,440,079 | 4/1969 | Jensen | 117—105 X |

JOHN T. GOOLKASIAM, Primary Examiner

M. E. McCAMISH, Assistant Examiner

U.S. Cl. X.R.

106—57; 117—105, 105.2; 264—12, 15; 252—301.1